United States Patent [19]

Suzuki

[11] Patent Number: 5,239,369
[45] Date of Patent: Aug. 24, 1993

[54] IMAGE PICKUP APPARATUS USED IN A FLICKERING LIGHT

[75] Inventor: Masao Suzuki, Tokyo, Japan

[73] Assignee: Canon Kabushiki Kaisha, Tokyo, Japan

[21] Appl. No.: 686,195

[22] Filed: Apr. 16, 1991

[30] Foreign Application Priority Data

Apr. 19, 1990 [JP] Japan .................. 2-101558

[51] Int. Cl.$^5$ .............................. H04N 9/73
[52] U.S. Cl. ....................... 358/41; 358/43; 358/44; 358/29
[58] Field of Search ............ 358/41, 43, 44, 29, 358/29 C

[56] References Cited

U.S. PATENT DOCUMENTS

| | | | |
|---|---|---|---|
| 4,739,393 | 4/1988 | Seki | 358/29 C |
| 4,739,394 | 4/1988 | Oda | 358/29 C |
| 4,774,564 | 9/1988 | Konishi | 358/41 |
| 4,833,525 | 5/1989 | Suzuki | 358/41 |
| 4,847,680 | 7/1989 | Okino | 358/41 |
| 4,851,897 | 7/1989 | Inuma | 358/41 |

FOREIGN PATENT DOCUMENTS 61-238191 10/1986 Japan .

*Primary Examiner*—James J. Groody
*Assistant Examiner*—Sherrie Hsia
*Attorney, Agent, or Firm*—Robin, Blecker, Daley & Driscoll

[57] ABSTRACT

An image pickup apparatus comprises, an image pickup device for inputting a subject light and converting the subject light into an electrical signal; and information input device for inputting information necessary for correcting the luminance level, color level, white balance, or the like of an output of the image pickup device, wherein an output of the information input device, which is obtained at a time earlier than the time the image pickup device inputs the subject light by a predetermined time obtained by multiplying the flicker frequency of an external light by a natural number, is averaged for the same period as the period the image pickup device inputs the subject light, and the averaged signal is used to correct a white balance.

20 Claims, 7 Drawing Sheets

IMAGE PICKUP APPARATUS USED IN A FLICKERING LIGHT

BACKGROUND OF THE INVENTION

1. Field of the Invention

The present invention relates to an image pickup apparatus, and more particularly to an image pickup apparatus capable of properly correcting a white balance and luminance level of an image illuminated by a light source having flickers.

2. Related Background Art

As an image pickup apparatus, there are known a video camera, a still video camera, and the like. An automatic tracing method of tracing a change of light from a light source is known as a method of adjusting a white balance. A fluorescent lamp used as a light source generates flickers. Therefore, an image taken under illumination by a light source of a fluorescent lamp becomes sometimes bluish or reddish. A proper white balance cannot be obtained with the automatic tracing method if the light amount incident to an image pickup device becomes different from the light amount incident to a white balance adjusting sensor, because of the influence of flickers. Such a case will be described more in detail with reference to FIG. 1.

FIG. 1 (i) shows a change of color of a fluorescent lamp caused by flickers. Red is above the line of a mean value, and blue is under the line. FIG. 1 (ii) and (iii) show the accumulation times of a charge coupled device serving as an image pickup device. FIG. 1 (ii) shows the accumulation time at a shutter speed 1/60 sec, and FIG. 1 (iii) shows the accumulation time at a shutter speed 1/1000 sec.

As seen from FIG. 1, since the accumulation time of a CCD is sufficiently long for the case of FIG. 1 (ii), an output of the CCD, i.e., an output mean value during the accumulation time takes a value substantially near the mean value of the light shown in FIG. 1 (i). However, the accumulation time for the case of FIG. 1 (iii) is short so that in some cases the output mean value of the CCD takes a value considerably different from the mean value of the light source. A colorimetry sensor used for adjusting a white balance generates colorimetry data at a very short instant of time as shown in FIG. 1 (iv). Therefore, the colorimetry data sometimes takes a value considerably different from the mean value of the light source depending upon the data read time. Therefore, the white balance adjustment becomes sometimes incorrect in both the cases of (ii) and (iii).

To avoid such incorrect adjustment, it has been proposed to use mean value data by integrating data taken by a colorimetry sensor for a predetermined time as shown in FIG. 1(v). In FIG. 1, if the colorimetry data for 10 ms is averaged and used as an output of the colorimetry sensor, the influence of flickers can be eliminated. In this case, if the low shutter speed shown in FIG. 1 (ii) is used, both the output of the CCD and the output mean value of the colorimetry sensor become near the mean value of the light source, resulting in a small error of the white balance.

However, if the high shutter speed shown in FIG. 1 (iii) is used, the output value of the CCD takes sometimes a value considerably different from the mean value of the light source.

In order to solve the above problem, as disclosed in Japanese Laid-open Patent Application No. 61-238191, it has been proposed to make the accumulation time of an image pickup device coincide with the output integrating (averaging) time of a colorimetry sensor.

With this method, however, making the input accumulation time of an image pickup device coincide with the integrating and averaging time of a colorimetry output of a colorimetry sensor results in the following disadvantages.

In an image pickup apparatus, before an output of an image pickup device starts being read after the accumulation of the image pickup device, a control voltage for adjusting the white balance should be established, the control voltage being derived from a colorimetry mean value obtained from a colorimetry sensor. In this case, the rise time of the output control voltage becomes significant. In some cases, it becomes impossible to use a noise eliminating low-pass filter in a control voltage output circuit. Furthermore, it takes a certain time for a microcomputer to execute a digital calculation so that it cannot be used for another processing during such time. These problems hinder an effective white balance adjustment.

SUMMARY OF THE INVENTION

The present invention solves the above problems and aims at providing an image pickup apparatus capable of properly correcting a white balance and luminance level without being influenced by flickers of a light source.

The above object is achieved by the present invention which provides an image pickup apparatus comprising: an image pickup device for inputting a subject light and converting the subject light into an electrical signal; and information input means for inputting information necessary for correcting the luminance level, color level, white balance, or the like of an output of the image pickup device. An output of the information input means which is obtained at a time earlier than the time the image pickup device inputs the subject light by a predetermined time obtained by multiplying the flicker frequency of an external light by a natural number, is averaged for the same period as the period the image pickup device inputs the subject light. The averaged signal is used to correct a white balance. Furthermore, the predetermined time is a time obtained by multiplying a least common multiple of flicker periods of a plurality of lights by a natural number.

With the image pickup apparatus of the present invention constructed as above, in taking an image of a subject under light having flickers, first an exposure amount is determined in accordance with an output of the information input means. The information input means receives the light having flickers to output a color signal and correct the white balance of the output of the image pickup device. This color signal is averaged for a predetermined time to obtain information to be used for the white balance correction. When a predetermined time obtained by multiplying the flicker frequency of an external light by a natural number lapses after the time when the information input means averaged the color signal, the image pickup device inputs the subject light for the same period as that required for averaging the color signal, and converts the inputted subject light into an electrical signal. This signal is subjected to the white balance correction in accordance with the color signal output of the information input means.

The predetermined time is set to a time obtained by multiplying a least common multiple of flicker periods of a plurality of lights by a natural number. It is therefore possible to properly correct the white balance under a light having a plurality of flicker periods. The natural number herein used is a positive integer exclusive of zero.

The other objects and advantages of the present invention will become apparent from the following detailed description when read in conjunction with the accompanying drawings.

BRIED DESCRIPTION OF THE DRAWINGS

Embodiments of the present invention will be described with reference to the accompanying drawings.

Figure 1:
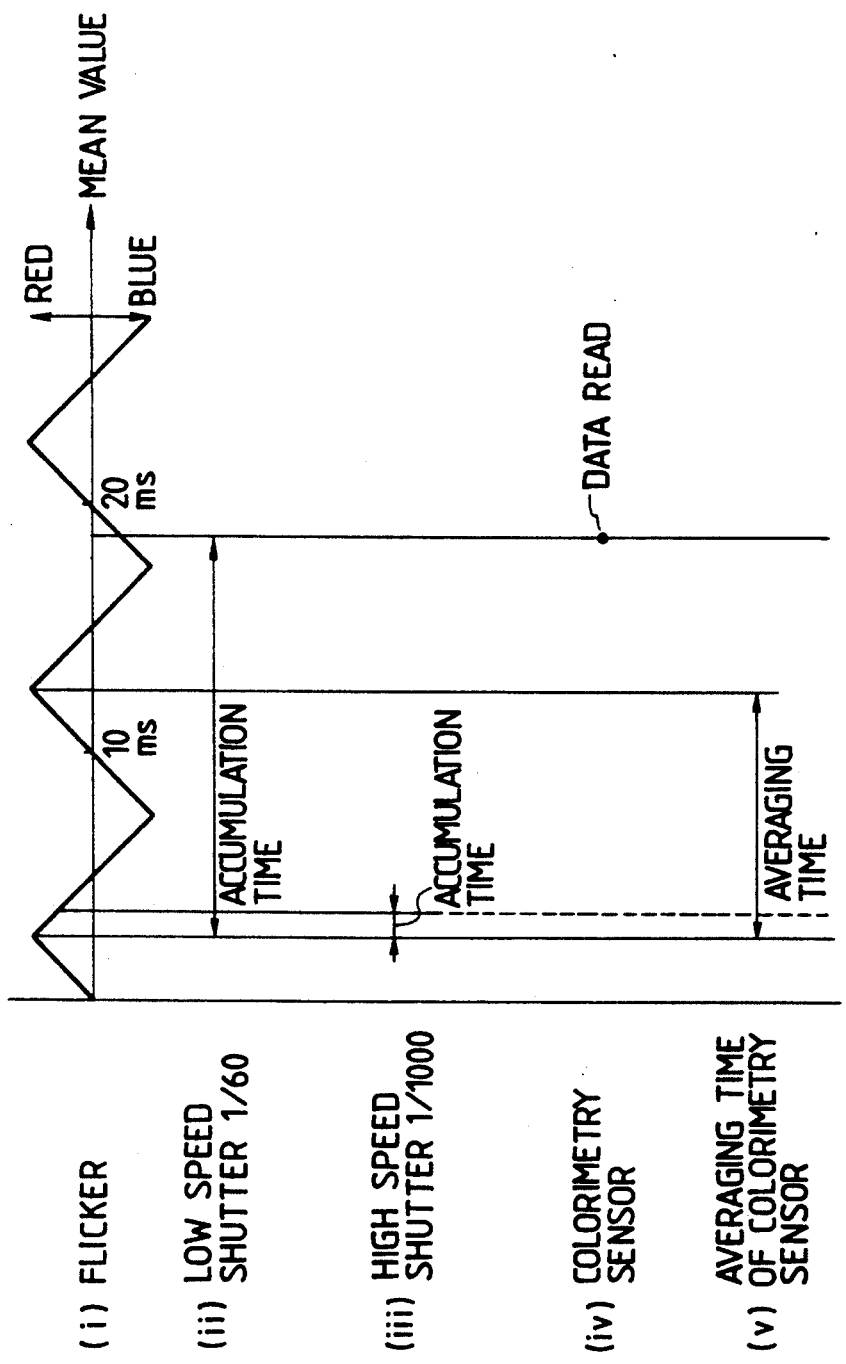
FIG. 1 is a diagram used for explaining the relationship between flickers and white balance correction according to a prior art.
Figure 2:
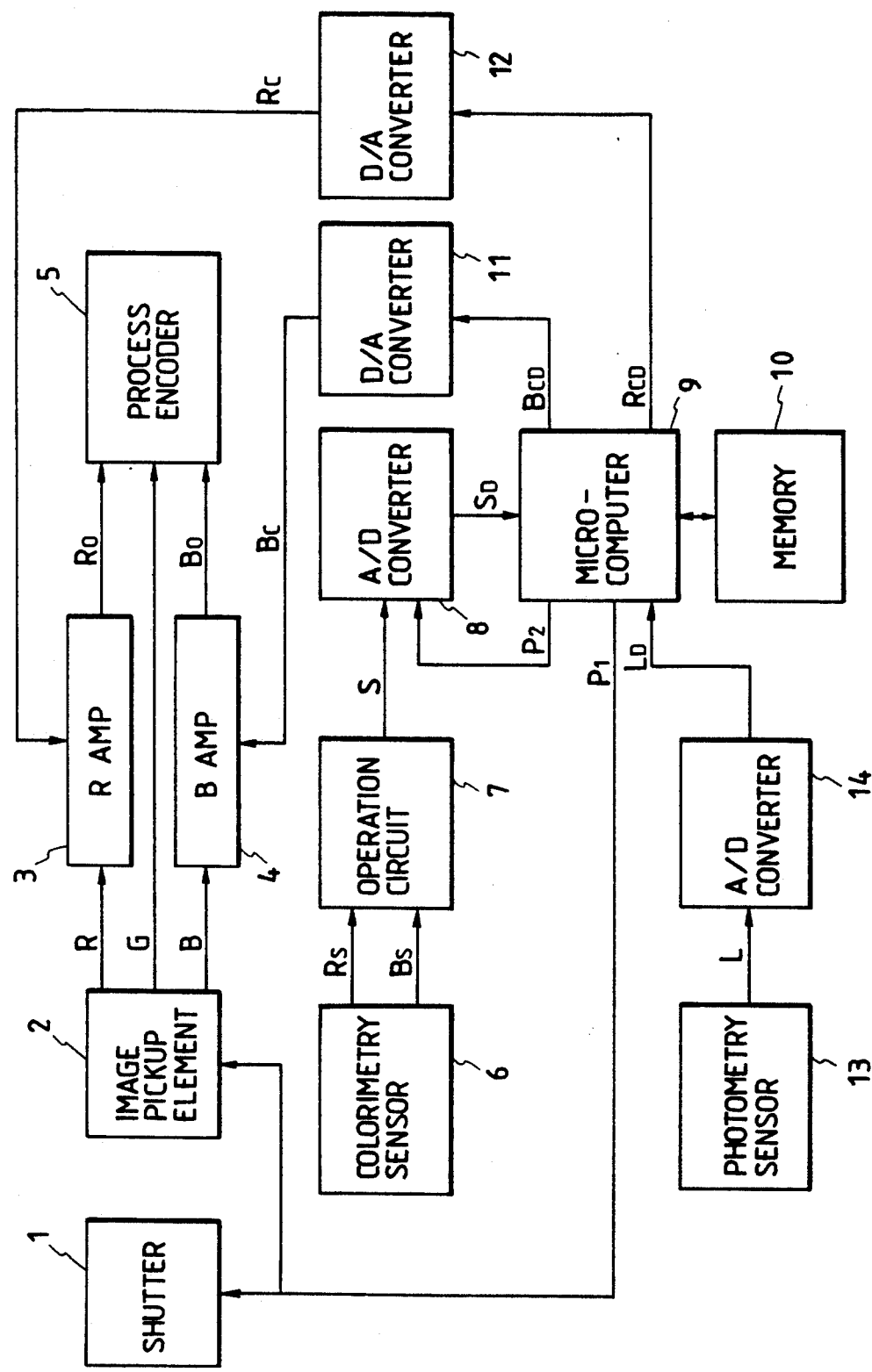
FIG. 2 is a block diagram showing an image pickup apparatus according to a first embodiment of the present invention.
Figure 3:
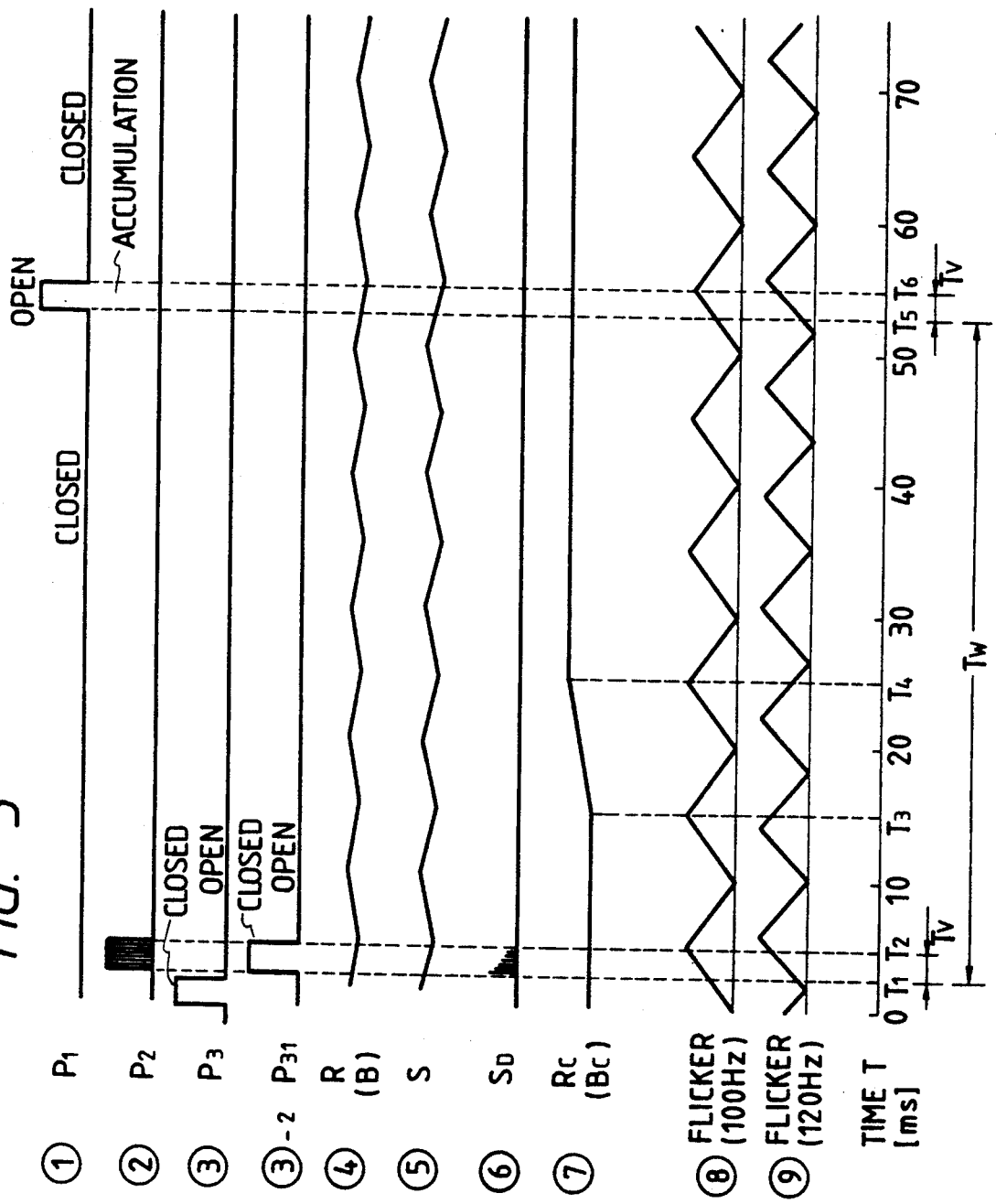
FIG. 3 is a timing chart used for explaining the operation of the image pickup apparatus of the present invention.
Figure 4:
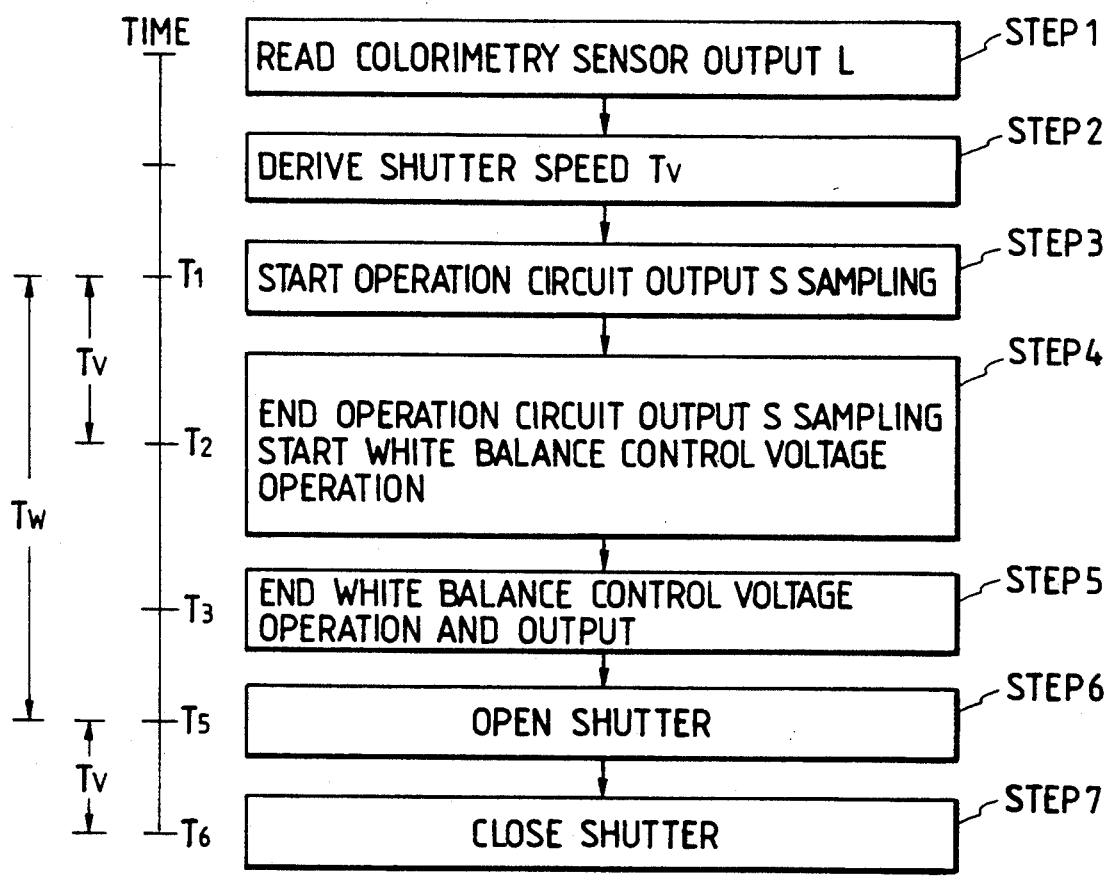
FIG. 4 is a flow chart used for explaining the operation of the microcomputer of the embodiment shown in FIG. 2.

FIGS. 2 and 3 show the first embodiment of the present invention. FIG. 2 is a block diagram showing the image pickup apparatus according to the first embodiment. In FIG. 2, reference numeral 1 represents a shutter. 2 represents an image pickup device for executing a photoelectric conversion. 3 represents an R (red) amplifier for controlling the signal level of an output R of the image pickup device 2. 4 represents a B (blue) amplifier for controlling the signal level of an output B of the image pickup device 2. 5 represents a process encoder for processing an output G of the image pickup device 2 and outputs Ro and Bo of the R and G amplifiers 3 and 4 and outputting a predetermined signal. 6 represents a colorimetry sensor serving as information input means for measuring the color of a light source and outputting color information Rs and Bs. 7 represents an operation circuit including logarithmic and differential circuits for processing the outputs Rs and Bs of the colorimetry sensor 6 and outputting a predetermined signal S. 8 represents an A/D converter for converting the output S of the operation circuit 7 into a digital signal. 9 represents a microcomputer for processing an output Sd of the A/D converter 8 to obtain white balance (WB) control voltages $R_{CD}$ and $B_{CD}$, and supplying timing pulses P1 and P2 to the shutter 1, image pickup device 2, and A/D converter 8 for the control of respective circuit blocks. 10 represents a memory for temporarily storing information necessary for the microcomputer 9. 11 and 12 represent D/A converters for converting digital output signals Rcd and Bcd of the microcomputer 9 into analog signals. 13 represents a photometry sensor serving as information input means for measuring the brightness of a subject to output information L. 14 represents an A/D converter for converting the output L of the photometry sensor 13 into a digital signal. FIG. 3 is a timing chart used for explaining the operation of the image pickup apparatus of the present invention, and FIG. 4 is a flow chart used for explaining the operation of the microcomputer 9.

The operation of the first embodiment will be described with reference to FIGS. 2 to 4. A numeral within parentheses represents a step number of the operation illustrated in FIG. 3.

First, an output L of the photometry sensor 13 is A/D converted by the A/D converter 14 whose output Ld is read by the microcomputer 9 (step 1).

The microcomputer 9 derives a shutter speed Tv from the information Ld (step 2). The red and blue components Rs and Bs outputted from the colorimetry sensor 6 are supplied to the operation circuit 7 and subjected to logarithmic compression and differential operation so that they are converted into a signal S given by ln(Rs/Bs). As shown in FIGS. 3 and 4, during the time period from T1 to T2, i.e., during the time period Tv, this signal S is sampled several times and A/D converted by the A/D converter 8. The obtained digital signals are stored in the memory 10 via the microcomputer 9. Timing pulses P2 for the sampling are sent from the microcomputer 9 (step 3).

After the end of sampling at time T2, the microcomputer 9 averages digital signals sampled several times $S_{D1}, S_{D2}, S_{D3}, \ldots, S_{Dn}$. Namely, the following average value is derived:

$$S_D = \frac{S_{D1} + S_{D2} + S_{D3} + \ldots + S_{Dn}}{n}$$

Further, the white balance control voltages $R_{CD}$ and $B_{CD}$ are derived from $\overline{S_d}$. If the ratio of red output R, green output G, and blue output B of the image pickup device 2 is not 1:1:1 when a white light is taken, the microcomputer 9 derives the Red and Bcd using an operation program such that the ratio Ro:G:Bo becomes 1:1:1, by adjusting the R and B output levels by the R and B amplifiers 3 and 4 (step 4).

The above operation by the microcomputer 9 terminates at time T3 when the voltages $B_{CD}$ and $R_{CD}$ are supplied to the D/A converters 11 and 12 and converted into analog signals. The analog white balance control voltages Bc and Rc are supplied to the R and B amplifiers 3 and 4. The period from T3 to T4 at Rc (Bc) shown at (7) in FIG. 3 is the period required for the gains of the R and B amplifiers 3 and 4 to become stable after the control voltages are outputted from the D/A amplifiers 11 and 12 (step 5).

Next, at time T5 after a lapse of a predetermined time Tw from T1, the shutter 1 is opened to receive a subject light by the image pickup device 2 so that the photoelectrically converted charges start being accumulated. In this embodiment, the predetermined time Tw is set to 50 ms which is a least common multiple of the flicker period 10 ms at the East Japan and the flicker period (1000/120) ms at the West Japan. At time T6 after the lapse of Tv, the shutter is closed to terminate the subject light input and accumulation.

Timing pulses P1 from the microcomputer 9 control the period Tv from time T5 to time T6 during which the shutter 1 is opened and the image pickup device 2 receives the subject light which is converted into electrical signal and accumulated (step 7).

Next, the accumulated image signal is read. The readout R and B signals are corrected to have proper level signals Ro and Bo by the R and B amplifiers 3 and 4 in accordance with the white balance control voltages Rc and Bc. Thereafter, the process encoder 5 obtains signals having a properly corrected white balance conforming with a predetermined standard, such as NTSC video signals.

The period for obtaining external information necessary for the white balance correction by using the information input means, i.e., the period from T1 to T2 for averaging and integrating an output of the colorimetry sensor 6, is the same as the period for obtaining external information by the image pickup device, i.e., the period from T5 to T6 for accumulating electric charges. Both the periods are Tv. As seen from the flicker waveforms of 100 Hz and 120 Hz shown in FIG. 3 ⑧ and FIG. 3 ⑨, the least common multiple 50 ms is used to obtain the flicker waveform portions for sampling and averaging which are quite the same as the earlier waveform portions by 50 ms. This embodiment method provides substantially the same advantageous effects as the operation of inputting and accumulating the subject light by the image pickup device 2 and the operation of inputting and averaging light by the colorimetry sensor 6 are carried out at the same time and for the same period. Namely, the white balance correction of the R and B outputs of the image pickup device indicated at ④ in FIG. 3 during the high level period of P1 indicated at ① is properly carried out in accordance with the information $S_D$ indicated at ⑥ obtained by sampling an output S indicated at ⑤.

With the above-described structure and operation, it is possible to provide an image pickup apparatus capable of correcting a white balance, determining an exposure amount, and correcting a luminance level and color level, without being adversely affected by light source flickers.

It is also possible to correct a white balance for a plurality of light sources having different periods of flickers.

2nd Embodiment

Figure 5:
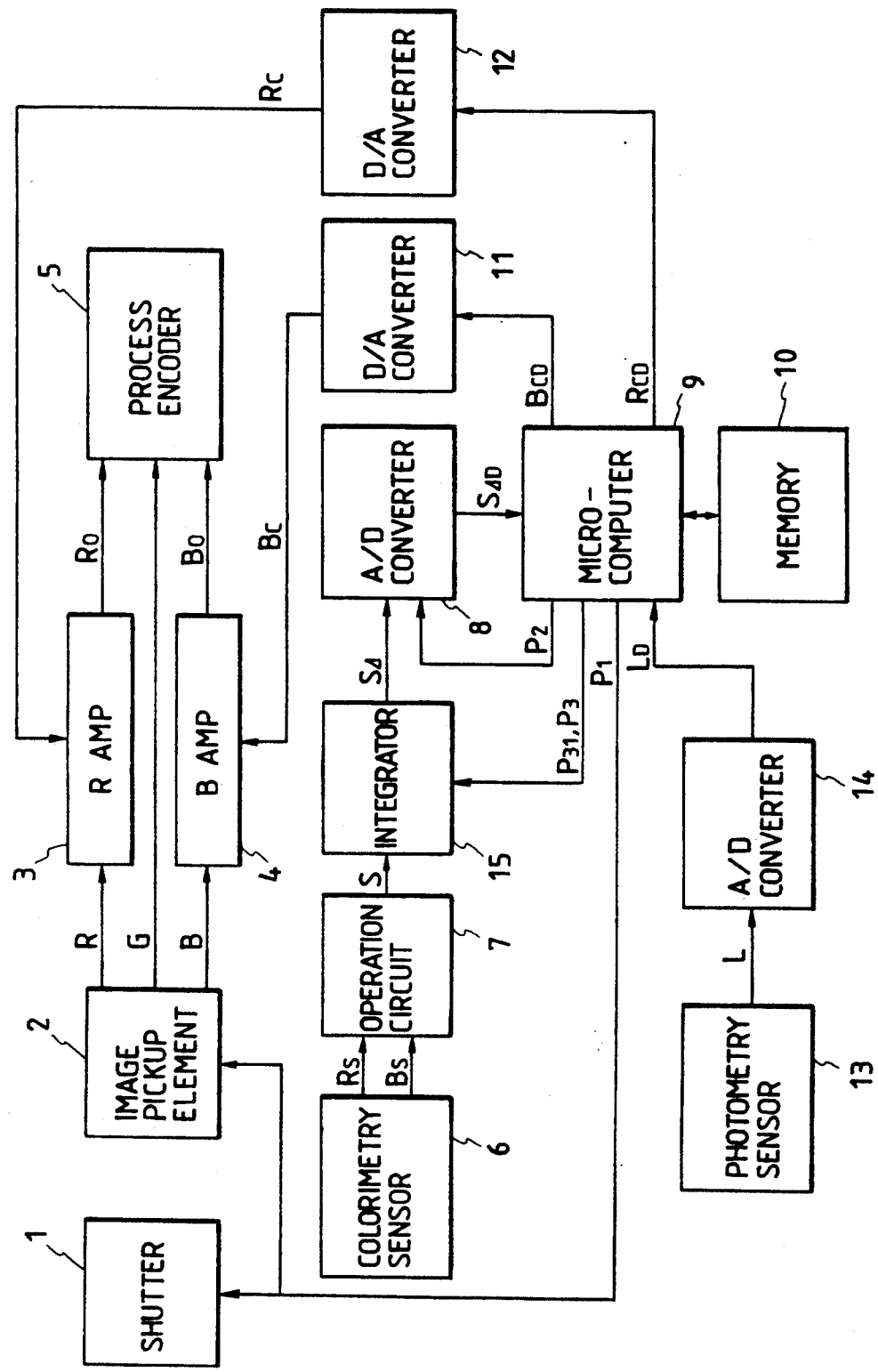
FIG. 5 is a block diagram showing an image pickup apparatus according to a second embodiment of the present invention.

FIG. 5 is a block diagram showing the second embodiment of the present invention. In FIG. 5, blocks having identical reference numerals to those shown in FIG. 2 have the same construction and operation as FIG. 2. Reference numeral 15 represents an integrator for integrating the output S of the operation circuit 7 for a predetermined time.

Figure 6:
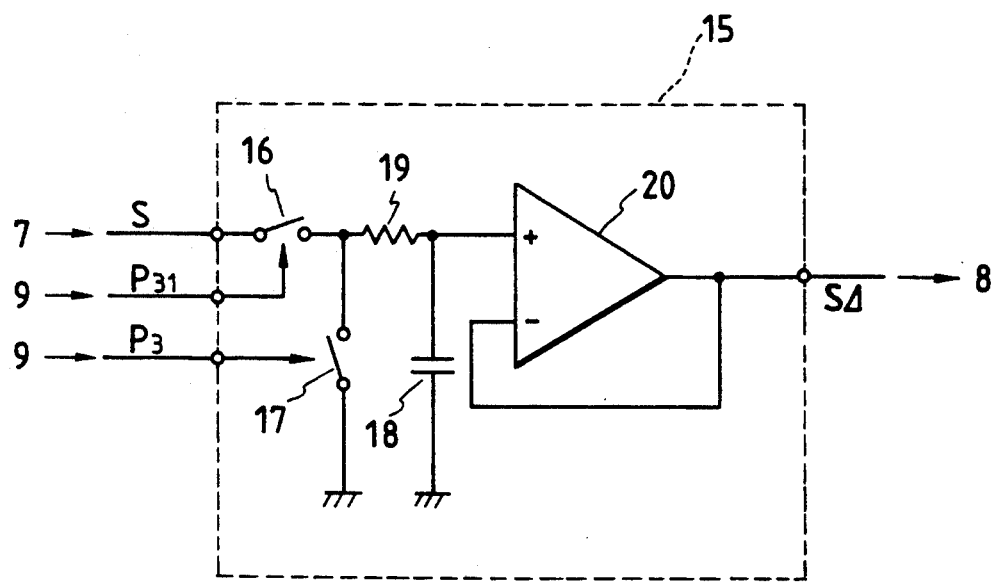
FIG. 6 is a block diagram showing the integrator of the second embodiment.

FIG. 6 is a circuit diagram of the integrator 15. Connected to the terminal to which the output S of the operation circuit 7 is inputted, is one contact of a switch 16 which turns on and off in response to timing pulses P31 from the microcomputer 9. The other contact of the switch 16 is connected to the positive input terminal of a buffer 20 via a resistor 19. The input side of the resistor 19 is grounded via a switch 17 which turns on and off in response to timing pulses P3 from the microcomputer 9. The output side of the resistor is grounded via a capacitor 18 which accumulates the input S from the operation circuit 7. The output terminal of the buffer 20 is fed back to the negative input terminal of the buffer 20. An output SΔ of the integrator 15 thus constructed is supplied to the A/D converter 8.

The operation of this embodiment will be described with reference to FIGS. 5, 6, and 3.

In FIG. 5, the circuit operation up to the input to the integrator 15 is the same as the first embodiment. In this embodiment, the output S of the operation circuit 7 is integrated by the integrator 15 for a predetermined period. First, the timing pulse P3 (③ in FIG. 3) from the microcomputer 9 takes a high level so that the switch 17 is closed and unnecessary electric charges accumulated within the capacitor 18 are discharged. Next, after the timing pulse P3 takes a low level and the switch 17 opens, the timing pulse P31 (③-2 in FIG. 3) from the microcomputer 9 takes a high level at time T1 to close the switch 16. Therefore, the output S from the operation circuit 7 is accumulated within the capacitor 18 via the resistor 19. At time T2 after the lapse of Tv from T1, the switch 16 opens to terminate the accumulation. As a result, the integrated value SΔ obtained by averaging the output S for the period from T1 to T2 is held in the capacitor and sent via the buffer 20 to the A/D converter 8. The A/D converter 8 converts the value SΔ into a digital value. The microcomputer 9 is not necessary to derive the average value as in the case of the first embodiment. Other blocks are the same as the first embodiment.

With the structure and operation described above, the operation of averaging the output of the colorimetry sensor is executed by the integrator 15 instead of the microcomputer 9. Therefore, the load of the microcomputer 9 can be reduced. In this manner, it is possible to provide an image pickup apparatus capable of properly correcting a white balance, determining an exposure amount, and correcting a luminance level and color level, without being adversely affected by flickers.

It is also possible to use a light source having a plurality of flicker periods.

3rd Embodiment

Figure 7:
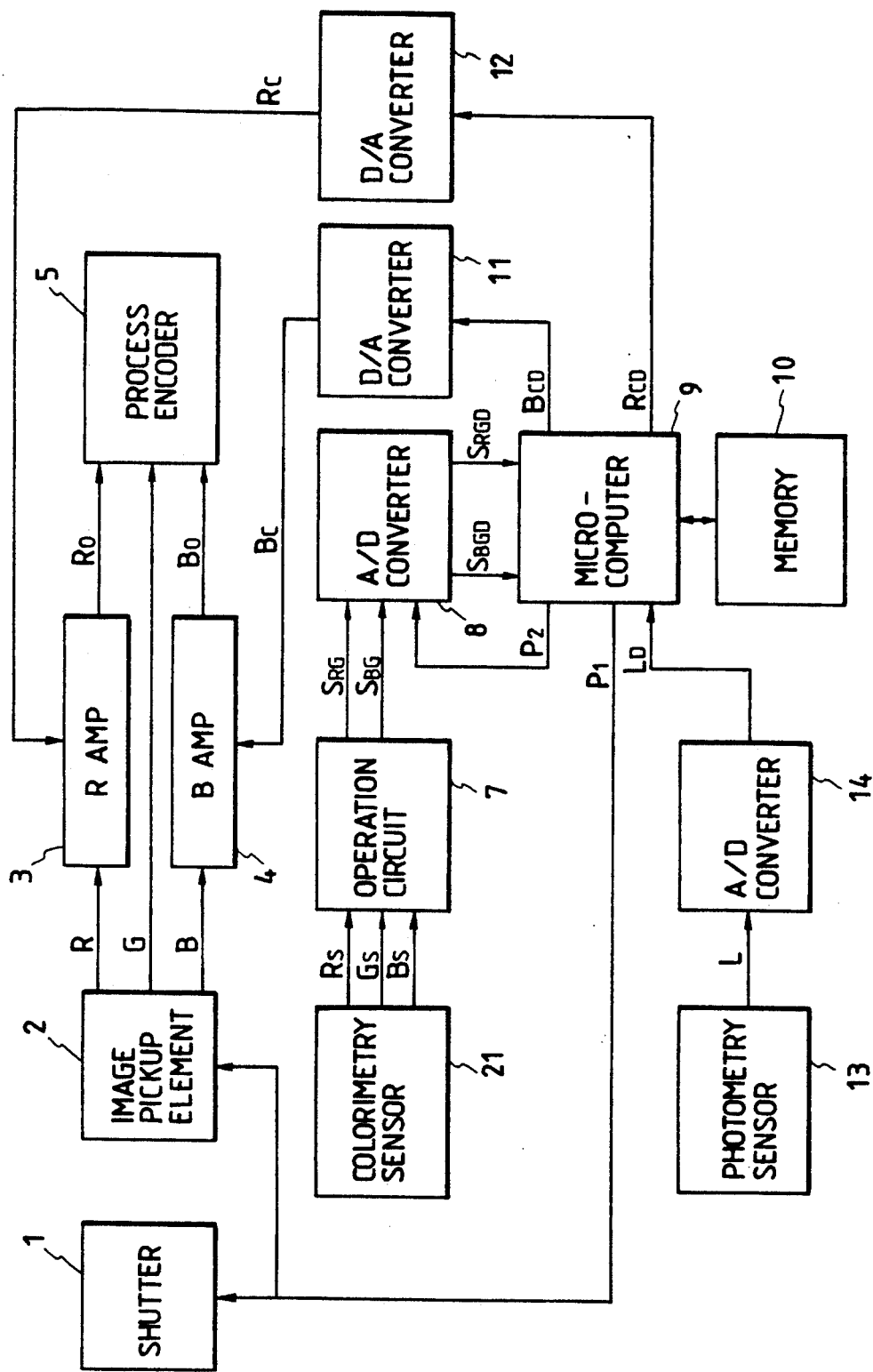
FIG. 7 is a block diagram showing an image pickup apparatus according to a third embodiment of the present invention.

FIG. 7 is a block diagram showing the third embodiment of the present invention. In FIG. 7, blocks having identical reference numerals to those shown in FIG. 2 have the same construction and operation as FIG. 2. Reference numeral 21 represents a colorimetry sensor serving as information input means for outputting electrical signals of the red, green and blue components Rs, Gs and Bs of a light source.

The Rs, Gs and Bs obtained by the colorimetry sensor 21 are sent to the operation circuit 7 to derive:

$$S_{RG} = \ln(Rs/Gs)$$

$$S_{BG} = \ln(Bs/Gs)$$

The outputs $S_{RG}$ and $S_{BG}$ of the operation ciruit 7 are A/D converted by the A/D converter 8 into $S_{RGD}$ and $S_{BGD}$ which are inputted to the microcomputer 9. The sampling timings and the operation of other blocks are the same as the first embodiment. The microcomputer 9 uses two information $S_{RGD}$ and $S_{BGD}$ for deriving the white balance control voltages, resulting in a more precise white balance adjustment.

Similar effects to the first embodiment are also obtained.

4th Embodiment

In the second embodiment, in averaging an output of the colorimetry sensor 6 serving as input information means, the output of the operation circuit is integrated.

In this embodiment, a differential circuit having an integration function is used in the operation circuit 7. In this case, the outputs Rs and Bs are applied across capacitors for a predetermined period from T1 to T2, and the charged voltages are read.

In this embodiment, the circuit scale can be made smaller than the case where a separate integrator is provided. Similar effects to the second embodiment are also obtained.

5th Embodiment

In the above embodiments, a mechanical shutter is used. Instead, a solid image pickup device may be used as the image pickup device to use its electronic shutter function. In this case, the number of mechanical components can be reduced. Similar effects to the above embodiments are also obtained.

6th Embodiment

Instead of deriving differential outputs after logarithmically converting the outputs Rs, Bs, and Gs of the colorimetry sensor serving as information input means, digital values obtained by A/D converters may be inputted to the microcomputer 9 to perform the differential operation. In this case, it is possible to omit the differential circuit. Other effects are similar to the above embodiments.

7th Embodiment

Instead of using the microcomputer 9 for deriving the control voltages as in the above embodiments, an analog circuit may be used. In this case, the present invention can be practiced by a system having no microcomputer. Other effects are similar to the first embodiment.

8th Embodiment

In the above embodiments, the operation of a still video camera has been described. The present invention is also applicable to a video camera, with similar effects of the above embodiments.

9th Embodiment

In the above embodiments, a white balance correction has been described. The present invention is also applicable to a luminance level correction.

In the above embodiments, it is possible to correct an exposure amount, luminance level, and color level.

10th Embodiment

In the above embodiments, the predetermined period Tw is set as 50 ms from the viewpoint that the apparatus can be used both in East and West Japan having light source flicker frequencies 100 Hz and 120 Hz, respectively. If the apparatus is dedicated to only East Japan or West Japan, the predetermined period is 10 ms multiplied by a natural number or (1000/120) ms multiplied by a natural number. Any frequency of a light source flicker can be dealt with changing the period Tw correspondingly. For example, for a light having flicker frequencies 100 Hz, 120 Hz, and 150 Hz, it is possible to provide the above embodiments by setting the predetermined period to 100 ms multiplied by a natural number, 100 ms being the least common multiple of the flicker frequencies.

Even under a light source having a single flicker frequency or a plurality of flicker frequencies, a proper white balance can be made. A natural number herein used is a positive number exclusive of zero.

11th Embodiment

In the description of the above embodiments, an output of the image pickup device is controlled in accordance with an output of the colorimetry sensor serving as information input means averaged for the same period at a time earlier than the time when the image pickup device inputs a subject light by a predetermined time. In a similar manner, an output of the image pickup device may be controlled in accordance with an output of the photometry sensor serving as information input means averaged for the same period at a time earlier than a predetermined time.

In this case, the exposure amount, luminance level, and color level are advantageously set to more proper values.

12th Embodiment

In the description of the above embodiments, information for correcting the luminance level, color level, and white balance of an output of the image pickup device is obtained from the external sensors such as colorimetry sensor and photometry sensor serving as information input means. In this embodiment, the image pickup device itself is used as the information input means.

Specifically, at the time earlier than the time when the image pickup device inputs image information light of a subject by the predetermined time Tw, the image pickup device inputs the subject light for the period Tv and averages it to obtain the white balance control voltages Rc and Bc which are applied to the R and B amplifiers as described in the above embodiments.

In this case, there are no adverse effects to be caused by a difference of spectral sensitivities or the like between the photometry sensor, colorimetry sensor, and image pickup device as in the case where information is obtained from an external sensor. Therefore, the white balance, luminance level, and color level can be more precisely corrected.

As described so far, according to the above embodiments, the color information and luminance information of a flicker light source during the input accumulation period of an image pickup device is collected in advance at the time determined from the flicker period. Namely, an output of the information input means, which is obtained at a time earlier than the time when the image pickup device inputs the subject light by a predetermined time obtained by multiplying the flicker frequency of the light source by a natural number, is averaged for the same period as the period the image pickup device inputs the subject light. Therefore, it is possible to provide an image pickup device capable of properly correcting the white balance and luminance level without being adversely affected by light source flickers. The averaged signal is used to correct a white balance.

If the predetermined time is set to a time obtained by multiplying a least common multiple of flicker periods of a plurality of lights by a natural number, it becomes possible to provide an image pickup device capable of properly correcting the white balance and luminance level even under a light source having a plurality of different flicker frequencies.

What is claimed is:

1. An image pickup apparatus comprising:
   an image pickup device for inputting a subject light from an object irradiated by a light source for a first period and converting said subject light into an electrical image signal;

obtaining means for obtaining information necessary for correcting the electrical image signal output from said image pickup device;

averaging means for averaging an output of said obtaining means for a second period, the second period having the substantial same length of time as the first period, the second period being earlier than the first period by a predetermined time provided by multiplying a flickering period of the light source by an integer; and correcting means for correcting the electrical image signal by using an output of said averaging means.

2. An image pickup apparatus according to claim 1, wherein said predetermined time is provided by multiplying a least common multiple of flickering periods of plurality of light sources by an integer.

3. An image pickup apparatus according to claim 1, wherein said image pickup device includes a CCD.

4. An image pickup apparatus according to claim 1, wherein said obtaining means includes a colorimetry sensor and said correcting means corrects a white balance of the electrical image signal.

5. An image pickup apparatus according to claim 1, wherein said light source includes a fluorescent lamp.

6. An image pickup apparatus comprising:
(a) image pickup means for converting a subject light from an object irradiated by a light source into a video signal;
(b) signal processing means for subjecting said video signal to a predetermined signal processing;
(c) obtaining means for obtaining information necessary for said predetermined signal processing, by receiving said subject light; and
(d) control means for controlling a receiving period of said subject light of said obtaining means such that said receiving period having the substantial same length of time as an exposure period of said image pickup means, and said receiving period is earlier than said exposure period by a predetermined time.

7. An image pickup apparatus according to claim 6, wherein said image pickup means includes a CCD.

8. An image pickup apparatus according to claim 6, wherein said signal processing means includes a white balance control circuit for controlling a white balance of the video signal.

9. An image pickup apparatus according to claim 8, wherein said obtaining means includes a colorimetry sensor.

10. An image pickup apparatus according to claim 6, wherein said subject light includes a light whose color components vary at a predetermined period.

11. An image pickup apparatus according to claim 10, wherein said light source includes a fluoescent lamp.

12. An image pickup apparatus according to claim 6, wherein said image pickup means and said obtaining means include a CCD used in common.

13. An image pickup apparatus according to claim 6, wherein said predetermined time corresponds to a flickering period of the light source.

14. An image pickup apparatus according to claim 13, wherein said flickering period is one of 1/50 second and 1/60 second.

15. An image pickup apparatus according to claim 13, wherein said predetermined time corresponds to a least common multiple of flickering period of plurality of light sources.

16. An image pickup apparatus according to claim 13, wherein said predetermined time corresponds to a multiple of a flickering period of the light source.

17. An image pickup apparatus comprising:
(a) image pickup means for accumulating an object light for a first period for converting an image of an object irradiated by a light source into a video signal;
(b) detection means for detecting a color temperature information related to the object;
(c) extracting means for extracting said color temperature information for a second period to produce a control signal;
(d) level adjusting means for adjusting levels of color signals included in the video signal in response to the control signal; and
(e) setting means for setting said first and second periods such that said first period having the substantial same length of time as said second period, and a timing of said second period is earlier than a timing of said first period by a predetermined time.

18. An image pickup apparatus according to claim 17, wherein said predetermined time corresponds to a flickering period of the light source.

19. An image pickup apparatus according to claim 17, wherein said predetermined time corresponds to a multiple of a flickering period of the light source.

20. An image pickup apparatus comprising:
(a) image pickup means for receiving an object light and for converting an image of an object irradiated by a light source into a video signal;
(b) exposure means for exposing said image pickup means to the object light for a first period;
(c) detection means for detecting a color temperature information related to the object;
(d) extracting means for extracting said color temperature information for a second period to produce a control signal; and
(e) setting means for setting said first and second periods such that said first period having the substantial same length of time as said second period, and a timing of said second period is earlier than a timing of said first period by a predetermined time.

* * * * *